Nov. 23, 1965
A. J. SIPIN
3,218,851
MASS FLOWMETER SYSTEMS
Filed May 24, 1961
2 Sheets-Sheet 1
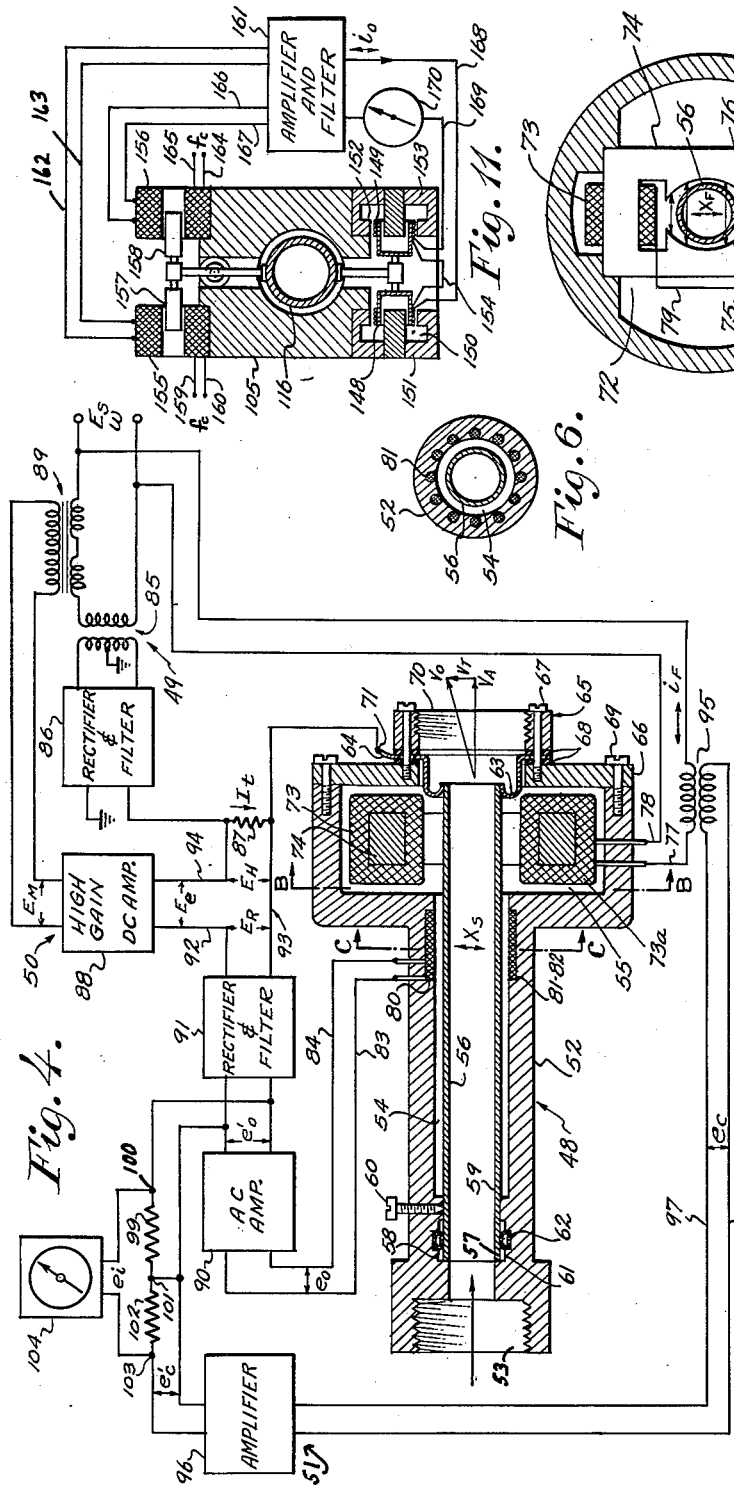
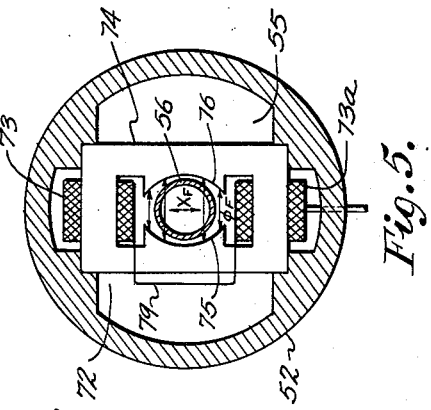
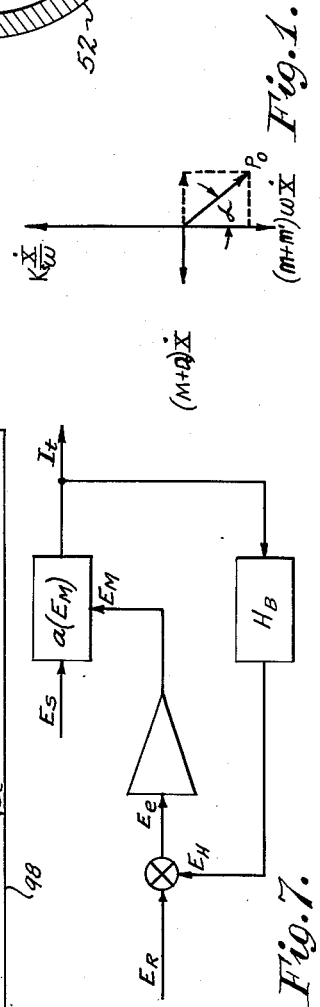
INVENTOR
ANATOLE J. SIPIN
BY Arthur H. Serrell
ATTORNEY Nov. 23, 1965    A. J. SIPIN    3,218,851
MASS FLOWMETER SYSTEMS
Filed May 24, 1961    2 Sheets-Sheet 2
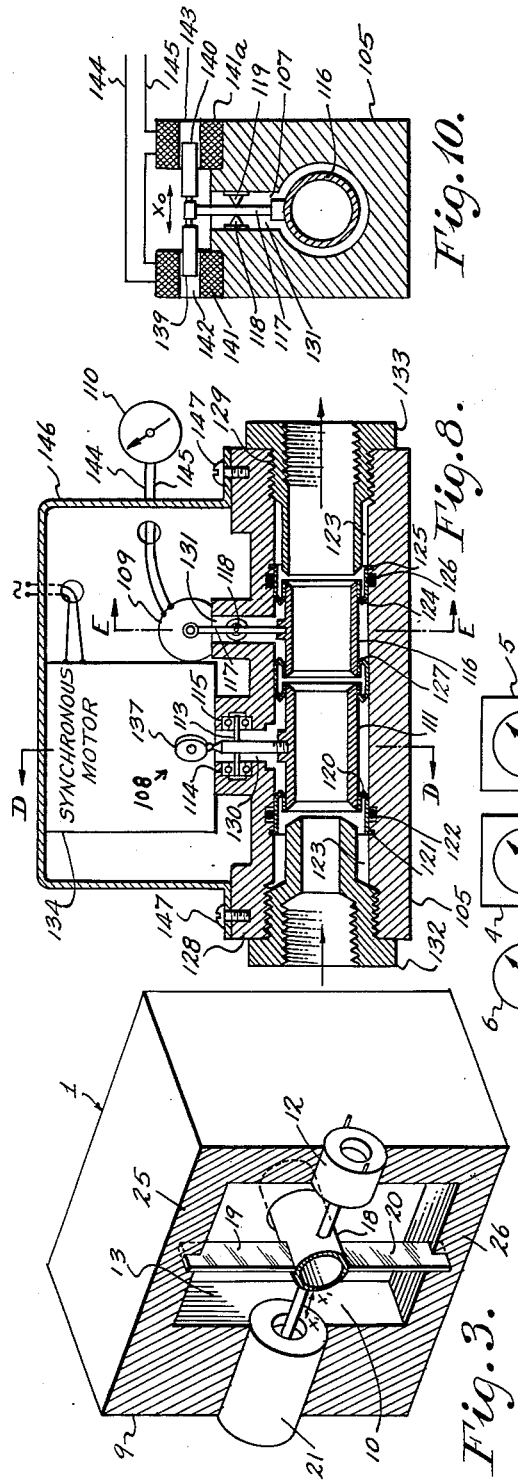
INVENTOR
ANATOLE J. SIPIN
BY Arthur H. Serrell
ATTORNEY United States Patent Office 3,218,851
Patented Nov. 23, 1965

3,218,851
MASS FLOWMETER SYSTEMS
Anatole J. Sipin, 117 E. 77th St., New York, N.Y.
Filed May 24, 1961, Ser. No. 112,393
14 Claims. (Cl. 73—194)

This invention relates to a system for measuring the mass of fluent matter flowing in a line such as liquids, gases and fluent solid material. The system requires no bends or revolving parts in the flow path.

There is widespread need for a system that measures mass flow with minimum resistance to the flow and without sliding surfaces in the flow path that could be attacked or could contaminate the flowing material, and that could provide undesirable leakage paths. In the chemical process industries, for example, it is frequently necessary to combine corrosive fluids in accurately maintained weight ratios. In aircraft flight refueling it is advantageous to measure the weight of fuel transferred at very high flow rates and very low pressure losses. In the food industry it is of major importance that the system be of such material and construction that the fluid cannot be contaminated or trapped in corners and revolving parts, and that it can be easily cleaned. In the pipeline industry weight metering of liquids, such as petroleum, is superior to volumetric metering because changes in density due, say, to trapped gases would not introduce weight flow error. Weight metering is advantageous for gaseous fuels because heating values vary with densities. Also, metering of gases must be done at very low pressure drops.

Other mass flowmeters that have obstruction-free flow passages are the rotating or oscillating gyroscopic meters of which several types are known. The gyroscopic meter has the disadvantage of requiring at least one and sometimes several loops with associated bends and turns between the flow inlet and outlet. For accurate flow measurement, moreover, the diameter of the loop must be ten to twenty or more times as large as the diameter of the flow passage (assuming circular cross-sections); and this requirement makes the apparatus large and cumbersome for the flow range. Because of the need for bends in the line, the gyroscopic meter is difficult to clean internally; and this constructional requirement makes the meter unsuitable where straight flow is required. In addition the rotating gyroscopic type of meter requires rotating fluid seals, introducing serious leakage and friction problems.

Other known flowmeters that require no revolving parts, bends, or obstructions in the flow passage, namely acoustical and electromagnetic meters, measure an average velocity, from which a volumetric flow rate is inferred. To obtain a mass flow indication, a separate density measurement and computation must be made.

One of the objects of this invention is to provide a system for measuring the mass of fluids or of fluent solids or of mixtures of these flowing in a line.

Another object of this invention is to provide a system with no revolving parts in the line.

A third object of this invention is to provide a system with minimal obstruction in the line, whose resistance to flow can be made substantially that of straight tube of the same cross-section as the flow passage.

A further object of this invention is to provide a system with a flow sensor for rapidly measuring high rates of flow.

Still another object of this invention is to provide a system for measuring mass of matter flowing in a line in which any of several electrical devices can be used to indicate the flow measurement.

The mass flow measuring principle used in the embodiments of this invention is that where an oscillatory motion is applied by a member to a bounded stream of material and there is a changing difference between a transverse momentum, that is momentum orthogonal to the axis of flow, of the fluent material entering the oscillating member and that leaving the oscillating member, mechanical energy is removed from the oscillating member and added to the stream at a rate directly proportional to the mass rate of flow.

It has been found that not only does the principle hold for a hollow member through which material is passing in free space but that it is also valid where the hollow member is suitably connected in a continuous line. In accordance with this invention the mass of matter flowing in a line is measured by sensing the alternating transverse momentum of the matter flowing in a transversely oscillating straight conduit, mounted in a housing with rigid inlet and outlet ports connected in the line. Various means by which this transverse momentum is measured are hereinafter described.

In the present specification, the term "vibration" will be used to describe any type of mechanical oscillation, not necessarily requiring mechanical compliance. Similarly, for the sake of convenience, all fluent materials will be termed "fluids"; but it is to be understood that the term refers to solids, liquids or gases capable of undergoing a change of transverse momentum when passing through the oscillating member.

If a hollow member, through which there is a unidirectional flow of fluid, be moved in translation in a direction orthogonal to the rectilinear flow axis with a transverse displacement $x_1$, a transverse velocity $\dot{x}_1$, and a transverse acceleration $\ddot{x}_1$, and if it is assumed that there is no transverse motion of the fluid prior to entering the hollow member, then the transverse force $F_t$, required to move the member and to produce the rate of change of transverse momentum experienced by the fluid in passing through the member is:

(1) $$F_t = (m+m')\ddot{X}_1 + M\dot{x}_1$$

where $m$ is the mass of fluid contained at any instant in the hollow member; $m'$ is the fixed mass of the moving member, and M is the rate of mass flow of fluid through the member. The second term ($\dot{X}_1 M$) is of principal interest in relation to this invention, since it shows that a force exists, proportional to mass flow rate, which is applied as an energy transfer between the moving member and the fluid. This is true whether the transverse velocity is constant or periodic. In this invention, the hollow member is vibrated through a small displacement (although the displacement could theoretically be of any magnitude), experiencing a periodic transverse force and adding a periodic transverse momentum to the effluent fluid, both in phase with the transverse velocity of the hollow member. If the energy transfer is determined by measuring the mechanical loss from the vibrating member due to mass flow, it is to be recognized that mass flow rate is experienced as (and has dimensions of) damping and can be measured by any of the many known devices for measuring the viscosity of fluids or internal damping of solids where a fixed sample is vibrated. The energy transfer, hence mass flow rate, can also be determined by measuring the transverse momentum of the fluid leaving the vibrating member, for example, by use of an additional downstream hollow member, transversely vibrated by the force of the effluent fluid, or by measuring the dynamic pressure of the fluid in a transverse direction to the axis of flow.

The principle does not require that the vibrating hollow member move in pure translation. The member can be rotated about a center located on the axis of flow at or before the inlet of the hollow member. In this event, the transverse torque $T_t$, required to move the member through an angle about its center and to produce the rate of change of transverse momentum experienced by the fluid in passing through the member is:

(2) $\quad T_t = (I+I')\ddot{\theta}_1 + ML^2\ddot{\theta}_1$ with the assumption that the member has a uniform cross-section and is pivoted at the inlet. Here I is the moment of inertia of the fluid contained at any instant in the hollow member about the center; $I'$ is the fixed moment of inertia of the hollow member about the center; $\dot{\theta}_1$ is the angular velocity of the member about the center; $\ddot{\theta}_1$ is the angular acceleration of the member about the center; and L is the length of the member. As before, the second term ($ML^2\ddot{\theta}_1$) is of most significance; and in this invention the angular motion would be periodic. If a transverse vibrating force $F_t$, is applied at the free end of the tube, that part, $mV\dot{\theta}_1$, required to overcome the damping effect of mass flow rate is equivalent to a Coriolis force, where V is the flow velocity and $V\dot{\theta}_1$ equivalent to a Coriolis acceleration. For small angular displacements and large radii from the center of rotation to the outlet of the hollow member:

$F_t = ML\ddot{\theta}_1$ approximately equals $M\ddot{x}_1$ and it is apparent that the measurement of mass flow rate applies to a translatory vibrating member as well as to a rotationally vibrating member, with an error depending on the magnitude of angular displacement. The error is negligible for an angular displacement below ±5°; and an angular displacement up to ±10° is tolerable.

It is evident, neglecting viscous drag, and barring moving elements in the stream, that the motion imparted to the stream by the vibrating element is through a component perpendicular to the stream direction at some point within the passage. The condition that must be satisfied for this invention is that the fluid leaving the vibrating member have a periodic transverse velocity component not present in the fluid entering the member.

Several embodiments of the invention are described hereinafter in connection with the following drawings, disclosing various specific features and advantages.

In the drawings,

FIG. 1 is a diagram showing vectorial relationships among vibrational forces;

FIG. 2 is a schematic view showing a preferred translational form of the invention in which various effects on vibratory quantities due to change in alternating transverse momentum are used to indicate the mass of matter flowing in the conduit;

FIG. 3 is a three dimensional section view of the vibratory flow sensing unit shown in FIG. 2;

FIG. 4 is a view similar to FIG. 2 showing a preferred rotational form of the invention in which the vibrating member is a cantilever tube;

FIG. 5 is a sectional view of the vibratory flow sensing element of FIG. 4 along line B—B, FIG. 4;

FIG. 6 is a sectional view of the vibratory flow sensing element of FIG. 5 along line C—C, FIG. 4;

FIG. 7 is a functional block diagram of part of the system shown in FIG. 5;

FIG. 8 is a view similar to FIG. 2 showing a form of the invention in which the momentum added to the fluid stream is directly sensed by a separate movable member;

FIG. 9 is a sectional view of the vibratory flow sensing element of FIG. 8 along line D—D, FIG. 8;

FIG. 10 is a sectional view of the vibratory flow sensing element of FIG. 8 along line E—E, FIG. 8; and FIG. 11 is a schematic diagram of a force-feedback system used with the vibratory flow sensing element of FIG. 8.

The vibratory mass flow metering system shown in FIGS. 2 and 3 consists of a vibratory flow sensor 1 excited by alternating electric current of frequency $\omega$ supplied through a variable power transformer 2, and various electrical measuring instruments, which are used separately or in combination to provide a mass flow rate indication. The electrical measuring instruments shown are a driving current ammeter 3, a wattmeter 4, an electric current phasemeter 5, a voltmeter 6, an electric voltage phasemeter 7, and a second voltmeter 8. These instruments are of any commonly known types performing similar functions. For example, ammeter 3 can be of the iron vane type, wattmeter 4 can be of the electrodynamometer type, phasemeter 5 can be of the moving coil type, voltmeter 6 can be of the electrodynamometer type, phasemeter 7 can be of the electronic "duty-cycle" type, voltmeter 8 can be of the electronic type with a rectified output energizing a D.C. galvanometer. The choice of instruments depends on the service conditions and system accuracy requirements. The vibratory flow sensor 1 consists of a housing 9, a vibratory flow tube assembly 10, a vibration driving coil 11, and a vibration velocity sensing coil 12. Housing 9 contains a central cavity 13, connected to a threaded fluid inlet port 14 by a passage 15, and to a threaded fluid outlet port 16 by a passage 17. The vibratory flow tube assembly 10 consists of a cylindrical tube 18, flat springs 19 and 20, centrally attached to diametrically opposite sides of tube 18, the central plane of the springs, parallel to their flat surfaces, including the longitudinal axis of tube 18, magnetic coil 11 attached to tube 18 through shaft 22 and cylindrical permanent magnetic core 23 attached to tube 18 through shaft 24. The longitudinal axes of coil 11 and core 23 are coincident, and the common axis intersects at right angles both the longitudinal axis of the flat springs 19 and 20 and the longitudinal axis of tube 18. Assembly 10 is suspended within cavity 13 by flat springs 19 and 20, whose outer ends are fixed in opposite walls 25 and 26 of housing 9. Vibration driving coil 11 is free to move within the permanent magnet field structure 21 in the axial direction $x_1$—$x_1$. Magnetic core 23 is coaxial with and free to move within vibration velocity pickup coil 12 in the same axial direction $x_1$—$x_1$. Tube 18 is permitted to move by translation in the direction $x_1$—$x_1$ by flexure of springs 19 and 20. To seal the fluid containing passages 15 and 17 from cavity 13, hollow flexible sealing rings 27 and 28 are in contact with the surface of tube 18 and slots in the fluid passages. These rings must be of high flexibility and have low internal damping so as not to interfere with the spring rate or add to fluid damping forces. Alternatively V or U-shaped rings or diaphragms can be used for sealing. Where low viscosity fluids are to be used the sealing rings can be eliminated. Alternating current at a constant voltage $E_s$, is applied to the primary of variable transformer 2, whose secondary supplies driving current $i_p$, to terminals 29 and 30 and coil 11 through leads 31 and 32. The driving current $i_p$ is passed through a small resistance 33 which delivers a voltage $e_1$, of the same phase and proportional to the driving current to the voltage phasemeter 7. The output voltage $e\dot{x}_1$ of the vibration velocity sensing coil 12 is fed through terminals 34 and 35 to leads 36 and 37 and thence to phasemeter 7 and voltmeter 8.

In operation an alternating current $i_p$ is applied from transformer 2 to vibration driving coil 11 which through the interaction of magnetic fields causes a vibratory force $P_d$ in phase with and proportional to current $i_p$ to be applied to coil 11 and therefore to the entire vibratory flow tube assembly 10. Tube 18 vibrates, therefore, in direction $x_1$—$x_1$ with a displacement $x_1$ at a time phase angle $\alpha$, with applied force $P_d$. Fluid with a mass rate of flow M and a total velocity identical with the axial velocity $V_A$ enters the vibratory flow sensor through passage 40 of fitting 38 into passage 15 and thence into passage 41 of the vibrating tube 18, from which it flows to passage 17 with a total velocity $V_O$, the vector sum of the original axial velocity $V_A$ and the added transverse velocity $V_T$. To avoid interference of the flow by edges of the flow tube and fittings at extreme vibrational deflections, flow passages are progressively increased in diameter in the direction of flow, passage 42 being larger than passage 41 which is larger than passage 40. Fittings 38 and 39 are located as close as possible to vibrating tube 18 to minimize expansion of flow into passages 15 and 17. Edges of fittings 38 and 39 and tube 18 are beveled to minimize viscous drag. According to the principle of the invention, the fluid leaving the vibrating element (tube 18) has a transverse fluid velocity $V_T$, equal in magnitude and phase to the vibratory velocity $\dot{x}_1$ of tube 18. Since the vibration sensing means is sensitive to vibrational velocity, the self generated output voltage $e_{\dot{x}_1}$ of coil 12 is proportional to and in phase with $\dot{x}_1$, hence the phase angle between the driving current $i_p$ and the vibration velocity voltage is $(90°)+\alpha$.

The devices by which mass flow rate can be measured with the system of FIG. 2 will now be explained. Assuming rectilinear coordinates and adding the force due to mechanical compliance of springs 19 and 20, the equation of motion is:

(3) $\quad (m+m')\ddot{x}_1+(M+D_o)\dot{x}_1+K_s x_1=P_d$ where $D_o$ is the combined viscous and internal damping coefficient of the vibrating system; and $K_s$ is its spring rate.

Assuming that the periodic vibration is produced by an applied sinusoidal force with fixed amplitude, $P_o$, and frequency $\omega$, and that the system coefficients are constant, the displacement of the vibrating member will also vary sinusoidally at the same frequency, but lag the applied force by a time phase angle $\alpha$. The vectorial relationships between maximum amplitudes of the applied force and the reactive and resistive forces of the vibrating system are shown in FIG. 1. For steady conditions there must be a balance between the reactive component of the applied force $P_o$ and the reactive system forces. There must also be a balance between the resistive component of the applied force and the system damping force.

*For reactive balance*

$$P_o \cos \alpha + (m+m')\dot{X}_1\omega - K_s X_1/\omega = 0$$

or $$[P_o \cos \alpha + (m+m')X_1\omega^2 - K_s X_1 = 0]$$

*For resistive balance*

$$P_o \sin \alpha - (M+D_o)\dot{X}_1 = 0$$

or $$[P_o \sin \alpha - (M+D_o)X_1\omega = 0]$$

Mass flow rate, then, can be expressed as:

(4) $\quad M = \dfrac{P_o \sin \alpha}{\dot{X}_1} - D_o$ or $$M = \dfrac{P_o \sin \alpha}{X_1 \omega} - D_o$$

To evaluate mass flow rate by the relationship shown in equation (4), it can be written as:

$$M = K_4 \dfrac{I_p \sin \alpha}{E_{\dot{x}_1}} - D_o$$

where ($I_p$) is the magnitude of driving current, $E_{\dot{x}_1}$ is the amplitude of vibration velocity voltage and $K_4$ is a proportionality constant. The total damping can be computed from readings of ammeter 3, phasemeter 7 and voltmeter 8. A base value $D_o$ computed at zero flow rate should be subtracted from all values of total damping to eliminate viscous and internal damping effects and provide a true mass flow rate value. For improved accuracy and sensitivity it is desirable to maintain the vibrational velocity constant at all values of mass flow rate. This technique has been found to neutralize the effects of nonlinearities in the vibrating system as well as permit directly proportional rather than reciprocal indications of mass flow rate. Such measurements are made by adjusting the variable transformer 2 until voltmeter 8 reads the required constant value of vibration voltage $e_{\dot{x}_1}$. Mass flow rate is then computed from readings of the ammeter 3 and phasemeter 7, the value of $e_{\dot{x}_1}$ being incorporated into a a new proportionality constant, $K_1$. If the fluid used has an invariant density and the excitation frequency is made equal to the constant and steady natural frequency of the vibrating system, $\sin \alpha = 1$; and if, as before, $e_{\dot{x}_1}$ is kept constant by variation of the driving current, mass flow rate can be read directly from ammeter 3. The natural frequency and excitation frequency are more advantageously maintained at the same value through use of an amplifier 43 which accepts the output voltage $e_{\dot{x}_1}$ from terminals 34 and 35 through leads 44 and 45 and delivers a driving current $\bar{i}_p$ in phase with $e_{\dot{x}_1}$ to terminals 29 and 30 through leads 46 and 47. Amplifier 43 and the vibrating system thus constitute an electromechanical oscillator; and since the driving current is in phase with the output voltage, hence vibrational velocity, $\sin \alpha = 1$. $e_{\dot{x}_1}$ may be maintained constant by manual adjustment of the gain of amplifier 43 or an automatic gain control of any of several well-known static magnetic or electronic systems can be used. For example, a saturable reactor biased by a D.C. signal varying with $e_{\dot{x}_1}$ could be used, or the D.C. signal could be used for bias on a variable mu electronic tube.

It is found that the flexible seals 27 and 28 or their equivalents are pressure sensitive to a degree depending on their construction. This has the effect of changing spring rate, and to a lesser extent internal damping, causing slight shifts in the resonant frequency. To improve accuracy and sensitivity as well as to eliminate possibility of rupture, chamber 13 is pressurized with gas from an external source to keep the pressure differential across the flexible seals at zero or a low positive value. Alternatively, chamber 13 could be filled with a low viscosity incompressible liquid, in which event external pressurization would not be required.

It is seen from the force balance relations of the vibrating system that mass flow rate can also be defined by the following equation:

(5) $\quad M = [K_s/\omega - (m+m')\omega] \tan \alpha - D_o$

For constant values of spring rate, fluid density and excitation frequency, it is evident that mass flow rate can be determined simply from a reading of phasemeter 7; and if the dial of phasemeter 7 is properly calibrated, mass flow rate can be indicated directly. For this measurement, the applied frequency $\omega$ can have any value but that of the system resonant frequency.

Mass flow rate can also be expressed by the following equation:

(6) $\quad M = \left[\left(\dfrac{P_o}{\dot{X}_1}\right)^2 - (\omega(m+m') - K_s/\omega)^2\right]^{1/2} - D_o$ If fluid density, spring rate and excitation frequency are constant and vibrational velocity is again maintained at a constant value, mass flow rate could be determined by a single reading of ammeter 3, since:

$$M = [K_6 I_D^2 - C_6]^{1/2} - D_o$$

in which $K_6$ and $C_6$ are constants.

The following expression can also be used to determine mass flow rate:

(7) $$M = \frac{2\pi}{(\dot{X}_1)^2} - D_o$$

where $\pi$ is the power supplied to the system. It is again desirable to maintain $e_{x_1}$, hence the vibrational velocity at a constant value by adjusting the variable transformer. In this instance, power can be read directly from the wattmeter 4, whose dial can be calibrated in units of mass flow rate. Alternatively, the mass flow rate can be computed from readings of ammeter 3, voltmeter 6 and phasemeter 5. As in the other measurements, a base reading is subtracted from the flow reading to eliminate the effect of zero flow damping. The practice based on Equation 7 measures mass flow rate by direct determination of the energy dissipated by the vibrating sensor, whereas the other practices measure mass flow rate by determining the change in mechanical impedance of the vibrating sensor caused by the energy transfer to the fluid stream.

The embodiment of the vibratory flow sensor shown in FIGURES 4, 5, 6 and 7 illustrates the rotational vibrating principle expressed in Equation 2. As shown in FIGURE 4, the rotationally vibrating flow tube is rigidly fixed at the fulcrum end so that the tube also acts as a cantilever beam supplying its own spring restoring force. Alternatively, the fulcrum end of the flow tube could be mounted on a hinge and a separate spring provided. The system disclosed is essentially a phase measuring device, which indicates the sine of the phase angle between the exciting force and the tube displacement as a measure of mass flow rate through the tube. Here the tube acts as a motor armature for applying the exciting force and also as a generator for inducing the output signal. A circuit is utilized which maintains a constant vibrational amplitude and eliminates unwanted quadrature components from the output.

The system consists of a vibratory flow sensor 48, a D.C. power supply 49 energized by alternating current at vibration frequency $\omega$, an electronic vibration driving current control circuit 50, a compensating voltage circuit 51, and several miscellaneous electrical components which are hereinafter described. The vibratory flow sensor 48 has a housing 52 with a threaded inlet port 53 opening into a long cylindrical passage 54, which terminates in a shorter cylindrical chamber 55 of substantially greater diameter than passage 54. The vibratory flow tube 56 is a thin walled tube, shown as having a circular cross-section, although other shapes could be used; and at rest the axis of the flow tube coincides with the longitudinal axis of housing 52. The diameter of passage 54 is stepped along its length; and in the region 57 the diameter is slightly less than the internal diameter of flow tube 56, forming a shoulder which acts as a longitudinal stop for the flow tube. The diameter of passage 54 in the region 59 is equal to the outer diameter $d$, of flow tube 56 within the tolerance for a snug fit. To prevent longitudinal motion of flow tube 56 in housing 52, one or more set screws 60 can be used as shown. In the region 61 passage 54 is undercut and grooved to accept an O-ring 62 of rubber or other suitable sealing material to prevent leakage of flowing fluid into the annular spaces between flow tube 56 and housing 52 in passage 54 and chamber 55. This manner of assembling flow tube 56 into housing 52 permits easy assembly and replacement of parts. At the other end, flow tube 56 is permanently bonded to a convoluted, flanged, cup-shaped diaphragm 63 made of metal or other flexible material. The flange 64 of diaphragm 63 is sandwiched between end-fitting 65 and cover plate 66, which are held together by screws 67. Gaskets 68 of rubber or other suitable material are placed on either side of flange 64 acting as fluid seals. In the construction shown in FIG. 4 flow tube 56, diaphragm 63, end-fitting 65, cover plate 66 and gaskets 68 are preassembled; and then the entire assembly is slid into housing 52 and fastened to it by screws 69 as well as set screws 60. Diaphragm 63 acts both as a fluid seal and as a conductor for electric current from terminal 71 to flow tube 56. Gaskets 68 also serve as electrical insulators for flange 64 of diaphragm 63. If a nonconductive material is used for diaphragm 63 or if no seal is required as when gas flow is measured, an additional flexible conductor, such as a coiled wire, would be required to supply electric current to the flow tube. In the construction of FIG. 4, the current passing through flow tube 56 returns through the wall of housing 52 in region 59. If a highly conductive fluid is being metered the flow tube would be insulated from the housing; and an insulated electrical lead would be used to return the current to the negative terminal of power supply 49 which would be isolated from ground potential.

The vibratory exciting field 72 is located in the annular space of chamber 55 between flow tube 56 and housing 52. The field structure consists of a split field coil 73 and 73a mounted on two legs of a permeable core 74 whose pole faces 75 and 76 direct alternating magnetic flux $\phi f$, through the space occupied by flow tube 56 and orthogonal to both the longitudinal axis of flow tube 56 and its direction of vibration $x_s$. The field coils are energized through leads 77 and 78; and lead 79 interconnects coils 73 and 73a. Field structure 72 as shown in FIGS. 4 and 5 is assembled into housing 52 prior to the assembly of the flow tube and cover plate. The vibration sensing coil 80 is prewound and the conductors 81 placed in longitudinal slots 82 in the walls of housing 52. The winding is similar to that found in common electric motors, such as induction motors, and the axes of the conductors are parallel to the longitudinal axis of flow tube 56. The vibration output voltage $e_o$ generated in coil 80 is fed to the electrical system through leads 83 and 84.

The D.C. power supply 49 consists of a transformer 85, energized by alternating current at vibration frequency $\omega$, whose secondary supplies low voltage alternating current to a full-wave rectifier and filter circuit 86, which in turn delivers direct current $I_t$, at the peak amplitude of its alternating input through resistor 87 to terminal 71 and thence to flow tube 56. The vibration driving current control circuit 50 consists of a high gain electronic D.C. amplifier 88 and a saturable reactor 89 in the input circuit to transformer 85. A block diagram is shown in FIG. 7, illustrating the functional operation of the control circuit, whose purpose is to keep the D.C. driving current $I_t$, directly proportional to the amplitude $e_o$ of the output voltage from the vibration sensing coil 80. The functional blocks of FIG. 7 include elements of the power supply 49 as well as those of the driving current control circuit 50, transfer function $a$, for example, including the characteristics of saturable reactor 89, transformer 85 and rectifier and filter 86. The alternating output voltage $e_o$ of sensing coil 80 is amplified by an A.C. electronic amplifier 90 to an alternating voltage $e'_o$ directly proportional to $e_o$. Voltage $e'_o$ in turn is fed to a rectifier and filter 91, which can be of the same design as rectifier and filter 86. The D.C. output voltage $E_R$ of rectifier and filter 91 is proportional to voltage amplitude $e_o$ and is the reference voltage shown in the block diagram of FIG. 7. Voltage $E_R$ is developed across leads 92 and 93. D.C. voltage $E_H$, directly proportional to driving current $I_t$, is developed across resistor 87 and leads 93 and 94. Leads 92 and 94 supply a voltage to amplifier 88 which is the difference between D.C. voltages $E_R$ and $E_H$, and is identical to the D.C. error voltage $E_e$ of the closed loop block diagram of FIG. 7.

The compensating voltage circuit 51 consists of a current transformer 95 and an A.C. voltage amplifier 96. The primary winding of current transformer 95 is in series with field coil 73 and is energized by the field excitation current $i_F$. The output voltage $e_c$ of current transformer 95 is an alternating voltage 90 degrees out of phase with the field excitation current $i_F$. Voltage $e_c$ is fed to voltage amplifier 96 through leads 97 and 98. The output voltage $e'_c$ of amplifier 96 is proportional to voltage $e_c$ at vibrational frequency $\omega$, and at a phase angle $\varphi$ of 90 degrees with respect to the field current $i_F$. The purpose of amplifier 96 is to prevent loading of current transformer 95. The amplified vibration output voltage $e'_o$ is developed across resistor 99 between terminals 100 and 101. The regulated compensation voltage $e'_c$ is developed across resistor 102 between terminals 101 and 103. The voltage $e_i$ fed to indicating voltmeter 104 from terminals 100 and 103 is the instantaneous difference between voltages $e'_n$ and $e'_c$. Voltage $e_i$ is directly proportional to the total damping coefficient of the vibratory flow tube 56, hence mass flow rate.

Satisfactory operation of the system of FIG. 4 depends on the instantaneous relationships among several varying quantities, which are now described. In the following consideration, the quantities C and K refer to constants. Application of the alternating line voltage $E_s$ to field coil 73 causes the flow of alternating field current, $$i_F = I_F \sin \omega t$$

which produces an alternating flux; $\phi_f = \phi_F \sin \omega t$, between longitudinal direct current $I_t$ in the wall of flow tube 56 applies a vibration force, $P_d = P_o \sin \omega t$, in a direction $x—x$ orthogonal to the directions of both flux $\phi_f$ and current $I_t$. The displacement $x_f$ of flow tube 56 in the central pole faces 75 and 76. The interaction of the flux with the plane of the pole faces lags the applied force by a time phase, $\alpha$ so that $x_f = X_f \sin(wt - \alpha)$. In this vibrational mode, the displacement $x_s$ of flow tube 56 in the central plane of sensing coil 80 is in phase with and proportional to $x_f$ by a constant $C_1$. Thus, $x_s = C_1 x_f$. The output voltage $e_o$ of sensing coil 80 is proportional to the rate of change of flux $\phi_o$ associated with the flow tube current $I_t$, which variation is caused by the variation.

$$\phi_o = K_s I_t x_s$$

$$e_o = K_o \left( \frac{d\phi_o}{dt} \right) = K_o K_s I_t \left( \frac{dX_s}{dt} \right) = K_o K_s C_1 I_t \left( \frac{dX_f}{dt} \right)$$

$$\frac{dX_f}{dt} = X_f \omega \cos(\omega t - \alpha) = X_f \omega [\cos \omega t \cos \alpha + \sin \omega t \sin \alpha]$$

The output voltage $e'_o$ of amplifier 90 is in phase and proportional to voltage $e_o$.

$$e'_o = C' e'_o = C' K_o K_s C_1 I_t \omega [\cos \omega t \cos \alpha + \sin \omega t \sin \alpha]$$

$$e'_o = E'_o [\cos \omega t \cos \alpha + \sin \omega t \sin \alpha]$$
$$= C_o \omega I_t X_f [\cos \omega t \cos \alpha + \sin \omega t \sin \alpha]$$

From FIGURE 7, it can be shown that the transfer function of the closed loop system can be expressed as:

$$E_R = \left( \frac{1 + aE_s K_g H_B}{aE_s K_g} \right) I_t$$

If the gain of amplifier 88 is sufficiently high, so that $aE_s K_g H_B \gg 1$ $$E_R = H_B I_t$$

The value of $H_B$ is actually that of resistance 87. The magnitude of $E_R$ is equal to the magnitude $E'_o$ of alternating voltage $e'_o$. Thus, $C_o I_t X_f \omega = H_B I_t$ and $H_B = C_o X_f \omega$. For constant excitation frequency:

$$\frac{X_f \omega = P_o \cos \alpha}{[K_s/\omega - (m+m')\omega]} = \frac{K_f E_s I_t \cos \alpha}{[K_s/\omega - (m+m')\omega]}$$

Where $E_s$ is the magnitude of alternating line voltage $e_s$ $K_s$ is an equivalent spring rate for the vibrating tube $(m+m')$ is an equivalent lumped mass for the vibrating tube $$I_t = H_B \frac{[K_s/\omega - (m+m')\omega]}{C_o K_f E_s \cos \alpha}$$

and $$e'_o = H_B{}^2 \frac{[K_s/\omega - (m+m')\omega]}{C_o K_f E_s} \left[ \cos \omega t + \sin \omega t \left( \frac{\sin \alpha}{\cos \alpha} \right) \right]$$

The output voltage $e_c$ of transformer 95 is 90 degrees out of phase with the field current $i_F$, that is $$e_c = E_c (\sin \omega t \pi/2) = -E_c \cos \omega t$$

By proper adjustment of the gain of amplifier 96 the amplitude $E'_c$ of alternating voltage $e'_c$ can be made equivalent to the amplitude $E'_o$ of alternating voltage $e'_o$, so that $$E'_c = E'_o - H_B{}^2 \frac{[K_s/\omega - (m+m')\omega]}{C_o K_f E_s}$$

Combining the voltages $e'_c$ and $e'_o$ so that the terms in $\cos \omega t$ are of opposite polarity by proper connection of resistors 99 and 102 the alternating indicator voltage $e_i$ is found as $$e_i = e'_o - e'_c = E'_o \left[ \cos \omega t + \sin \omega t \left( \frac{\sin \alpha}{\cos \alpha} \right) \right] - E'_o \cos \omega t$$

$$e_i = E'_o \sin \omega t \left( \frac{\sin \alpha}{\cos \alpha} \right) = E'_o \sin \omega t \tan \alpha$$

From FIGURE 1

$$\tan \alpha = \frac{(M+D_o)\dot{X}}{(K_s \dot{X}/\omega - (m+m')\omega \dot{X})} = \frac{MD_o}{(K_s/\omega - (m+m')\omega)}$$

$e_i$ is and the amplitude $E_i$ of the alternating indicator voltage $$(8) \quad E_i = H_B{}^2 \frac{[K_s/\omega - (m+m')\omega]}{C_o K_f E_s} \frac{(MD_o)}{[K_s/\omega - (m+m')\omega]}$$

$$E_i = C_i(M+D_o)$$

The final measurement is an alternating voltage at vibration frequency with an amplitude proportional to the total damping or neglecting other factors, mass flow rate. Since the system actually detects the change in vibration phase angle with damping it can be operated at any but the resonant frequency, in which case the phase angle is constant at 90°. The vibratory flow sensor 48 can be used in place of the vibratory flow sensor 1 with any of the measuring devices illustrated in FIGURE 2.

The proportions of the vibratory flow sensor depend on the required accuracy, sensitivity and electric power limitations. The length to internal diameter ratio $(L_t/d_2)$ of flow tube 56 is limited by flow velocity forces, spring hysteresis and stress distribution. The disturbing flow velocity force is a momentum force caused by bending of the flow tube, hence the flow path. This force is proportional to the mass flow rate multiplied by the axial velocity. The net effect of the velocity force is to alter the spring rate, hence the resonant frequency of the vibratory system. For any given vibration amplitude the longer the flow tube the less its curvature and the smaller the effect of flow velocity forces. Therefore, to minimize flow velocity forces, a large value of $(L_t/d_2)$ is desirable. Since spring hysteresis is a damping force it can interfere with measurement of damping due to mass flow. Therefore, it is desirable that the ratio of total damping to spring force be as high as possibble. This is achieved by having a high curvature of the flow tube during vibration, i.e. a small length to diameter ratio. The minimum value of $(L_t/d_2)$ is determined by fiber stress distribution. Because of the dependence of the measuring system on simple harmonic oscillations, vibrations of the flow tube should conform to simple beam theory. According to St. Venant's principle, at a distance of one diameter from the constrained tube end, the stresses will conform to pure bending. Therefore, the sensing coil should not be closer to the fixed end than 1½ diameters of the tube and the minimum value of ($L_t/d_2$) is taken as 2.

In general the following values are recommended for design of the flow tube:

Ratio of length to internal diameters, ($L_t/d_2$)—no more than 15:1 or less than 2:1, preferably between 10:1 and 5:1.

Ratio of external to internal diameter ($d_1/d_2$)—no more than 1.05:1 or less than 1.01:1.

Maximum flow velocity:

50 to 100 ft./sec. for liquids
    200 to 500 ft./sec. for gases

In the tandem tube embodiment of FIGURES 8, 9, 10 and 11, a form of the invention is shown in which the periodic momentum added to the fluid stream by a vibrating member is sensed by an independent movable member with an output indicating mass flow rate. The sensor consists of a housing 105, a flow vibrating tube assembly 106, a flow momentum sensing tube assembly 107, a vibration driving motor assembly 108, a momentum sensing tube motion pickup 109, a flow rate indicating voltmeter 110 and several miscellaneous elements. The vibrating tube assembly 106 consists of a flow tube 111 suspended by a connecting rod 112 from a shaft 113 mounted on two ball bearings 114 and 115. The top end of rod 113 is reduced in area and rounded to serve as a cam follower. The momentum sensing assembly 107 consists of a flow tube 116 suspended by a rod 117 from jewelled bearings 118 and 119. The inlet end of tube 111 is attached to an annular cup spring 120 which is held in place by snap ring 121 and sealed by O-ring 122 in the wall of cavity 123 in housing 105. The outlet end of tube 116 is similarly attached to annular cup spring 124 which is held in place by snap ring 125 and sealed by O-ring 126 in the wall of cavity 123 in housing 105. Double-sided annular spring 127 is connected to the downstream end of tube 111 and the upstream end of tube 116. At its center cross-section, spring 127 presses against the wall of cavity 123 in housing 105 so as to prevent transmission of motion from tube 111 to tube 116 through the spring. At its left end cavity 123 connects with threaded inlet port 128. At its right end cavity 123 connects with threaded outlet port 129. Passage 130 provides access to cavity 123 for rod 112. Passage 131 provides access to cavity 123 for rod 117. Inlet fitting 132 is threaded into inlet port 128. Outlet fitting 133 is threaded into outlet port 129. The diameter of flow passages in fitting 132, flow tube 111, flow tube 116 and outlet fitting 133 are progressively increased in that order to prevent interference with flow due to displacement of the movable flow tubes. The driving motor assembly 108 consists of a synchronous motor 134, mounted on a bracket 135 which is fastened to housing 105 with screws 136. A double acting wobble plate cam 137 is fastened to shaft 138 of motor 134. The cam engages the top end of rod 112 and imparts a periodic oscillation in the direction $X_d$, FIG. 9, to flow tube 111 at a frequency proportional to the synchronous speed of motor 134, hence line frequency. The momentum sensing tube motion pickup 109 consists of magnets 139 and 140 attached to opposite sides of rod 117 and free to move respectively in direction $X_o$, within center holes 142 and 143 of split coil 141 and 141a. Motion of magnets 139 and 140 induces a voltage in split coil 141 and 141a proportional to the transverse velocity of flow tube 116. This voltage is led to the flow rate indicating A.C. voltmeter 110 through leads 144 and 145. Protective dust cover 146 is attached to housing 105 with screws 147.

The relative weights of magnets 139 and 140 of fluid filled tube 116 and moment arms of rod 117 are so selected that the inertias on both sides of bearings 118 and 119 are balanced. The momentum sensing assembly 107 is thus made insensitive to linear accelerations transmitted through the housing. Annular springs 124 and 127 not only serve as fluid seals but also supply compliance to assembly 107 and center the flow tube 116.

The transverse momentum force applied to the moving fluid by flow tube 111 is expressed by the following equation:

$$p_d = P_d \sin \omega t = MX_d \omega \sin \omega t$$

If the natural frequency of the momentum sensing assembly 107 is several times greater than the excitation frequency the reaction of the momentum sensing assembly will be characterized by its compliance; and the displacement:

$$x_o = X_o \sin \omega t = \frac{M}{K_o}(X_d - X_o) \sin \omega t$$

where $K_o$ is the spring rate of the momentum sensing assembly. The value of the displacement of flow tube 116 will ordinarily have an order of magnitude less than that of flow tube 111 and can be ignored for the purposes of this description.

(9)      Therefore $x_o = \frac{M}{K_o} X_d \sin \omega t$ and the output voltage $e_o = \frac{C_o}{K_o} MX_d \omega \sin \omega t$ For a constant frequency, $\omega$ and a constant displacement $X_d$ of the vibrating flow tube 111, the output voltage is an alternating voltage at excitation frequency with an amplitude proportional to mass flow rate. Hence, the indication on voltmeter 110 is directly proportional to mass flow rate.

FIGURE 11 shows a variation of the momentum sensing assembly where the system restoring force is mainly supplied by an electromagnetic structure rather than the annular springs. Here the sensing flow tube 116 is connected at the lower end to two coils 148 and 149. Coil 148 is located in air gap 150 in the field of permanent magnet 151. Coil 149 is located in air gap 152 in the field of permanent magnet 153. The two coils are connected electrically in series through lead 154 so that the same current passes through each coil causing a force in the same direction. The sensing tube motion pickup consists of two oppositely wound linear variable transformers 155 and 156, in place of split coil 141 and 141a and two opposite magnetic cores 157 and 158 in place of permanent magnets 139 and 140. The primary of transformer 155 is excited at carrier frequency $f_c$, through leads 159 and 160. The output of the secondary winding of transformer 155 is fed to amplifier 161 through leads 162 and 163. The primary of transformer 156 is excited at carrier frequency $f_c$ through leads 164 and 165. The output of the secondary winding of transformer 156 is fed to amplifier 161 through leads 166 and 167. The outputs of transformers 155 and 156 are compared in amplifier 161 and any unbalance voltage is passed through a carrier filter and causes a proportional current $i_o$ at vibration frequency to be passed through leads 168 and 169 to coils 148 and 149. With a high gain amplifier the displacement $X_o$ of flow tube 116 can be made negligible and the magnitude $I_o$ of alternating current $i_o$ will be directly proportional to transverse force applied by the fluid stream, hence to mass flow rate. This current is indicated by ammeter 170 which is calibrated directly in units of mass flow rate. The conduit means provided in the respective embodiments of the invention shown in the drawings is of relative uniform internal cross-sectional wall area throughout its length.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Means for metering the mass of matter flowing in a line, including a closed housing in a portion of the line with rigid inlet and outlet ports arranged in coaxial and axially spaced relation, a conduit in the housing having a straight bore with an upstream end adjacent the inlet port and a downstream end adjacent the outlet port providing a continuous passageway for the matter flowing in the line between the ports, means for vibrating the conduit in transverse relation to the line of flow with the downstream end of the conduit moving differentially with respect to the outlet port to impart an alternating transverse momentum to the matter flowing in the conduit, and means responsive to the alternating transverse momentum of the matter flowing in the conduit for providing a measure of the mass of the flowing matter.

2. Metering means of the character claimed in claim 1 in which the measure providing means measures the mechanical impedance of the conduit and the flowing matter therein.

3. Metering means of the character claimed in claim 1 in which the vibrating means vibrates the flowing matter at a constant amplitude of transverse velocity, and the measure providing means measures the force required to operate the vibrating means.

4. Metering means of the character claimed in claim 3 in which the conduit is vibrated at resonant frequency.

5. Metering means of the character claimed in claim 1 in which the force required to operate the vibrating means is maintained at a constant amplitude and the measure providing means measures the transverse velocity of the conduit.

6. Metering means of the character claimed in claim 5 in which the conduit is vibrated at resonant frequency.

7. Metering means of the character claimed in claim 1 in which the closed housing is a pressure compartment.

8. Metering means of the character claimed in claim 1 in which the vibrating means vibrates the flowing matter at a constant amplitude of transverse velocity, and the measure providing means measures the power required to operate the vibrating means.

9. Metering means of the character claimed in claim 8 in which the conduit is vibrated at resonant frequency.

10. Metering means of the character claimed in claim 1 in which the measure providing means measures the reaction of the conduit to the transverse vibrations of the flowing matter therein.

11. Metering means of the character claimed in claim 10 in which the conduit is vibrated at resonant frequency.

12. Metering means of the character claimed in claim 1 in which the measure providing means measures the difference in the phase relation between the vibrations of the conduit and the force required to operate the vibrating means.

13. Metering means of the character claimed in claim 1 in which the conduit is a rigid tube, and the vibrating means includes a movable part connected to the tube midway between its ends.

14. Metering means of the character claimed in claim 1 including a member for sealing the flow line between the inlet port and the upstream end of the conduit, and a member for sealing the flow line between the outlet port and the downstream end of the conduit.

References Cited by the Examiner
UNITED STATES PATENTS

| | | | |
|---|---|---|---|
| 2,635,362 | 4/1953 | Poole et al. | 73—71.4 X |
| 2,889,702 | 6/1951 | Brooking | 73—67.1 X |
| 2,943,476 | 7/1960 | Bernstein | 73—32 |
| 2,987,915 | 6/1961 | Hildenbrandt | 73—228 X |
| 3,009,104 | 11/1961 | Brown | 73—67.5 X |
| 3,021,708 | 2/1962 | November et al. | 73—194 |
| 3,046,780 | 7/1962 | Liebermann | 73—1953 |
| 3,080,750 | 3/1963 | Wiley et al. | 73—67.2 X |

RICHARD C. QUEISSER, *Primary Examiner.*

ROBERT L. EVANS, JOSEPH P. STRIZAK, *Examiners.*